United States Patent
Livshits et al.

(10) Patent No.: US 10,115,116 B2
(45) Date of Patent: Oct. 30, 2018

(54) OPTIMIZING EFFICIENCY AND COST OF CROWD-SOURCED POLLING

(71) Applicant: Microsoft Technology Licensing, LLC, Redmond, WA (US)

(72) Inventors: Benjamin Livshits, Kirkland, WA (US); Todd Mytkowicz, Redmond, WA (US); Georgios Kastrinis, Athens (GR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 545 days.

(21) Appl. No.: 14/635,110

(22) Filed: Mar. 2, 2015

(65) Prior Publication Data

US 2016/0259824 A1   Sep. 8, 2016

(51) Int. Cl.
| | | |
|---|---|---|
| G06F 7/00 | (2006.01) | |
| G06F 17/30 | (2006.01) | |
| G06Q 30/02 | (2012.01) | |

(52) U.S. Cl.
CPC ....... *G06Q 30/02* (2013.01); *G06F 17/30442* (2013.01); *G06F 17/30448* (2013.01);
(Continued)

(58) Field of Classification Search
None
See application file for complete search history.

(56) References Cited

U.S. PATENT DOCUMENTS

| | | |
|---|---|---|
| 8,069,078 B2 | 11/2011 | Seeman |
| 8,290,810 B2 | 10/2012 | Ramer et al. |
| | (Continued) | |

FOREIGN PATENT DOCUMENTS

EP   2402894 A1   1/2012

OTHER PUBLICATIONS

Livshits et al., "Optimizing Human Computation to Save Time and Money", MSR-TR-2014-145, Published Nov. 11, 2014.*
(Continued)

*Primary Examiner* — David T. Brooks
(74) *Attorney, Agent, or Firm* — Alleman Hall Creasman & Tuttle LLP

(57) ABSTRACT

A "Poll Optimizer" provides automated techniques for performing various combinations of both static and runtime optimizations for crowd-sourced queries including, but not limited to, crowd-sourced opinion-based polls. These optimizations have been observed to improve poll performance by reducing factors such as completion times, monetary costs, and error rates of polls. In various implementations, the Poll Optimizer receives an input query representing a crowd-sourced poll that is formatted as a multi-layer structure (e.g., LINQ-based queries natively supported by .NET languages, JQL-based queries supported by JAVA, etc.). The Poll optimizer then iteratively reduces the multi-layer structure of the input query to construct a reformulated query. This reformulated query is then matched to an optimized execution process selected from a plurality of predefined execution processes. Finally, the reformulated query and matching optimized execution process are provided as an optimized version of the crowd-sourced poll for execution via a computer-based crowd-sourcing backend.

20 Claims, 5 Drawing Sheets

(52) U.S. Cl.
    CPC .. *G06F 17/30463* (2013.01); *G06F 17/30471* (2013.01); *G06F 17/30474* (2013.01); *G06Q 30/0203* (2013.01)

(56) References Cited

U.S. PATENT DOCUMENTS

| | | | |
|---|---|---|---|
| 8,661,023 B1 | 2/2014 | Chun et al. | |
| 8,812,645 B2 | 8/2014 | Barsness et al. | |
| 9,317,551 B1* | 4/2016 | Zander | G06F 17/3041 |
| 2003/0229639 A1* | 12/2003 | Carlson | G06F 17/30474 |
| 2009/0144229 A1* | 6/2009 | Meijer | G06F 17/30436 |
| 2010/0293026 A1* | 11/2010 | Vojnovic | G06Q 10/06311 |
| | | | 705/7.13 |
| 2011/0066473 A1* | 3/2011 | Bernick | G06Q 30/02 |
| | | | 705/7.32 |
| 2012/0072261 A1* | 3/2012 | Oberoi | G06Q 30/02 |
| | | | 705/7.32 |
| 2012/0265573 A1* | 10/2012 | Van Pelt | G06Q 10/063114 |
| | | | 705/7.14 |
| 2013/0179226 A1* | 7/2013 | Adams | G06Q 30/02 |
| | | | 705/7.35 |
| 2013/0197954 A1* | 8/2013 | Yankelevich | G06Q 30/02 |
| | | | 705/7.13 |
| 2014/0019435 A1* | 1/2014 | Ceri | G06F 17/30864 |
| | | | 707/712 |
| 2014/0067472 A1* | 3/2014 | Mayes | G06Q 30/0203 |
| | | | 705/7.32 |
| 2014/0279780 A1* | 9/2014 | Dasgupta | G06N 5/02 |
| | | | 706/46 |

OTHER PUBLICATIONS

Park et al., Query optimization over crowdsourced data. Proc. VLDB Endow. 6, 10 (Aug. 2013), 781-792.*
Barowy, et al., "AutoMan: A Platform for Integrating Human-based and Digital Computation", In Proceedings of the ACM International Conference on Object Oriented Programming Systems Languages and Applications, Oct. 19, 2012, 16 pages.
Bleja, et al., "Optimization of Object-oriented Queries through Rewriting Compound Weakly Dependent Subqueries", In Proceedings of the 21st International Conference on Database and Expert Systems Applications, Aug. 30, 2012, 8 pages.
Bornholt, et al., "Uncertain<T>: A First-Order Type for Uncertain Data", In Proceedings of the 19th International Conference on Architectural Support for Programming Languages and Operating Systems, Mar. 1, 2014.
Cheney, et al., "A Practical Theory of Language-integrated Query", In Proceedings of the 18th ACM SIGPLAN international conference on Functional programming, Sep. 25, 2013, 14 pages.
Cooper, et al., "Evaluating the College Sophomore Problem: The Case of Personality and Politics", The Journal of Psychology, Jan. 2011, 16 pages.
Couper, Mick P., "Web Surveys: A Review of Issues and Approaches", The Public Opinion Quarterly, vol. 64, Retrieved on: Dec. 4, 2014, 31 pages.
Dillman, et al., "Principles for Constructing Web Surveys", In Technical Report of SESRC, Retrieved on: Dec. 4, 2014, 16 pages.
Franklin, et al., "Crowddb: Answering Queries with Crowdsourcing", In Proceedings of the ACM SIGMOD International Conference on Management of Data, Jun. 12, 2011, 12 pages.
Grust, et al., "Avalanche-safe LINQ Compilation", In Proceedings of the VLDB Endowment, vol. 3, Issue 1, Sep. 13, 2010, 11 pages.
Gunn, Holly, "Web-based surveys: Changing the Survey Process", In Journal of First Monday, vol. 7, No. 12, Dec. 2, 2002, 11 pages.
Ioannidis, Yannis E., "Query Optimization", In ACM Computer Surveys, Mar. 1996, 38 pages.
Ipeirotis, et al., "Quizz: Targeted Crowdsourcing with a Billion (Potential) Users", In Proceedings of the 23rd International Conference on World Wide Web, Apr. 7, 2014, 11 pages.
Keeter, et al., "A Comparison of Results from Surveys by the Pew Research Center and Google Consumer Surveys." www.peoplepress.org, Nov. 7, 2012, 30 pages.
Kittur, et al., "CrowdWeaver: Visually Managing Complex Crowd Work", In Proceedings of the ACM Conference on Computer Supported Cooperative Work, Feb. 11, 2012, 4 pages.
Kittur, et al., "CrowdForge: Crowdsourcing Complex Work", In Proceedings of the 24th Annual ACM Symposium on User Interface Software and Technology, Oct. 16, 2011, 10 pages.
Kulkarni, et al., "Collaboratively Crowdsourcing Workflows with Turkomatic", In Proceedings of the ACM Conference on Computer Supported Cooperative Work, Feb. 11, 2012, 10 pages.
Kulkarni, et al., "Turkomatic: Automatic Recursive Task and Workflow Design for Mechanical Turk", In Proceeding of Extended Abstracts on Human Factors in Computing Systems, May 7, 2011, 6 pages.
Little, et al., "TurKit: Tools for Iterative Tasks on Mechanical Turk", In Proceedings of the ACM SIGKDD Workshop on Human Computation, Jun. 28, 2009, 2 pages.
Livshits, et al., "Interpoll: Crowd-sourced Internet Polls (Done Right)", In Technical Report, Jan. 7, 2014, 12 pages.
Marcus, et al., "Counting with the Crowd", In Journal of Proceedings of the VLDB Endowment, vol. 6, Issue 2, Aug. 26, 2013, 12 pages.
Marcus, et al., "Human-powered Sorts and Joins", In Journal of Proceedings of the VLDB Endowment, vol. 5, Issue 1, Aug. 27, 2012, 12 pages.
Murray, et al., "Steno: Automatic Optimization of Declarative Queries", In Proceedings of the 32nd ACM SIGPLAN Conference on Programming Language Design and Implementation, Jun. 4, 2011, 11 pages.
Nerella, et al., "An Approach for Optimization of Object Queries on Collections Using Annotations", In Proceedings of 17th European Conference on Software Maintenance and Reengineering, Mar. 5, 2013, 10 pages.
Schueller, et al., "Stream Fusion Using Reactive Programming, LINQ and Magic Updates", In 16th International Conference on Information Fusion, Sep. 12, 2013, 8 pages.
Tawalare, et al., "Query Optimization to Improve Performance of the Code Execution", In Proceedings of Computer Engineering and Intelligent Systems, vol. 3, No. 1, Jan. 2012, 10 pages.
Tosch, et al., "Surveyman: Programming and Automatically Debugging Surveys", In Proceedings of the ACM International Conference on Object Oriented Programming Systems Languages & Applications, Oct. 15, 2014, 13 pages.
Truong, et al., "Programming Hybrid Services in the Cloud", In Proceedings of the 10th international conference on Service-Oriented Computing, Nov. 12, 2012, 15 pages.
"Current Population Survey—School Enrollment and Internet use Supplement File", In Technical Documentation—CPS —10, Oct. 2010, 248 pages.
Wyatt, Jeremy C., " When to use web-based surveys", In Journal of the American Medical Informatics Association, vol. 7, No. 4, Jul. 2000, 5 pages.
Marcus, et al., "Crowdsourced Databases: Query Processing with People", In Fifth Biennial Conference on Innovative Data Systems Research, Jan. 9, 2011, 4 pages.
Feng, et al., "CrowdDB: Query Processing with the VLDB Crowd", In Proceedings of the VLDB Endowment, vol. 4, No. 12, Aug. 29, 2011, 4 pages.
Retelny, et al., "Expert Crowdsourcing with Flash Teams—A Status Report", In Proceedings of the 27th annual ACM symposium on User interface software and technology, Oct. 5, 2014, 11 pages.
Galindo-Legaria, et al., "Orthogonal Optimization of Subqueries and Aggregation", In Proceedings of the ACM SIGMOD international conference on Management of data, May 21, 2001, pp. 571-581.
Trushkowsky, et al., "Crowdsourced Enumeration Queries", In Proceedings of the IEEE International Conference on Data Engineering, Apr. 8, 2013, 12 pages.
Acosta, et al., "A SPARQL engine for crowdsourcing query processing using microtasks—Technical Report", In Techinical Report 3033, Retrieved on: Dec. 3, 2014, 7 pages.

(56) References Cited

OTHER PUBLICATIONS

Lin, et al., "Programming Self-Optimizing Workflows for Crowdsourcing—A Status Report", Published on: Aug. 15, 2013 Available at: http://homes.cs.washington.edu/~chrislin/papers/CC13abstract.pdf.
Gruenheid, et al., "Cost-Efficient Querying Strategies for the Crowd", In Proceedings of the ACM SIGMOD international conference on Management of data, Jun. 22, 2014, 4 pages.
Mozafari, et al., "Scaling Up Crowd-Sourcing to Very Large Datasets: A Case for Active Learning", In Proceedings of the VLDB Endowment, vol. 8, Issue 2, Sep. 1, 2014, 12 pages.

* cited by examiner

OPTIMIZING EFFICIENCY AND COST OF CROWD-SOURCED POLLING

BACKGROUND

Online polls and surveys are often used to obtain information relating to specific topics from general or specific population groups. The information derived from such polls and surveys may be used for a variety of purposes, including, but not limited to, marketing studies, product development, political polls, customer satisfaction surveys, medical questionnaires, etc. Crowd-sourcing is increasingly being used to implement these types of online polls and surveys. In this regard, many crowd-sourcing systems perform tasks such as attracting crowd-sourced workers, building and presenting polls and surveys, consolidating poll and survey results, managing payment to workers, etc.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be noted or discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Poll Optimizer," as described herein, provides various automated techniques for optimizing crowd-sourced polls to reduce or minimize various combinations of factors that include, but are not limited to, poll completion times, poll costs, and poll error rates. For example, in various implementations, the Poll Optimizer receives an input query representing a crowd-sourced poll that is formatted as a multi-layer structure (e.g., LINQ-based queries natively supported by .NET languages, JQL-based queries supported by JAVA, etc.). The Poll optimizer then iteratively reduces the multi-layer structure of the input query to construct a reformulated query. This reformulated query is then matched to an optimized execution process selected from a plurality of predefined execution processes. Finally, the reformulated query and matching optimized execution process are provided as an optimized version of the crowd-sourced poll for execution via a computer-based crowd-sourcing backend.

In view of the above summary, it is clear that the Poll Optimizer described herein provides various techniques for optimizing crowd-sourced polling. In addition to the just described benefits, other advantages of the Poll Optimizer will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
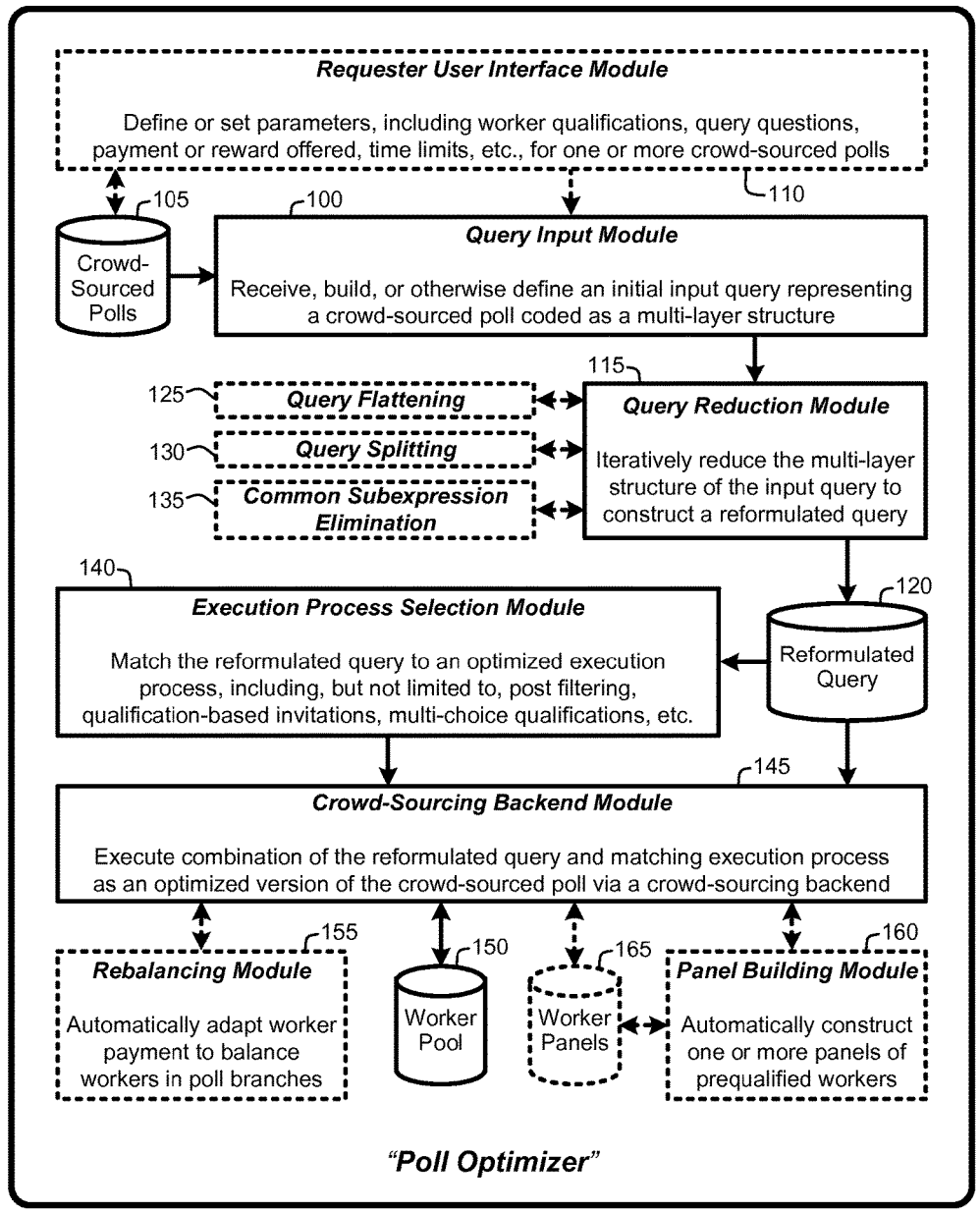
FIG. 1 provides an exemplary architectural flow diagram that illustrates program modules for effecting various implementations of a Poll Optimizer, as described herein.

In the following description of various implementations of a "Poll Optimizer," reference is made to the accompanying drawings, which form a part hereof, and in which is shown by way of illustration specific implementations in which the Poll Optimizer may be practiced. It should be understood that other implementations may be utilized and structural changes may be made without departing from the scope thereof.

It is also noted that, for the sake of clarity, specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Poll Optimizer. Further, the appearance of such phrases throughout the specification are not necessarily all referring to the same implementation, nor are separate or alternative implementations mutually exclusive of other implementations. It should also be understood that the order described or illustrated herein for any process flows representing one or more implementations of the Poll Optimizer does not inherently indicate any requirement for the processes to be implemented in the order described or illustrated, nor does any such order described or illustrated herein for any process flows imply any limitations of the Poll Optimizer.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction

In general, a "Poll Optimizer," as described herein, performs various combinations of both static and runtime optimizations for crowd-sourced queries. Examples of crowd-sourced queries include, but are not limited to, crowd-sourced opinion-based polls and other personal or subjective queries or surveys. Note that the following discussion may interchangeably refer to polls, queries and surveys.

In various implementations, the Poll Optimizer receives an input query representing a crowd-sourced poll that is formatted as a multi-layer structure (e.g., LINQ-based queries natively supported by .NET languages, JQL based queries supported by JAVA, etc.). The Poll optimizer then iteratively reduces the multi-layer structure of the input query to construct a reformulated query by applying one or more optimizations (e.g., optimizations such as query flattening, query splitting, common subexpression elimination, etc.) to reduce a complexity of the input query. This reformulated query is then matched to an optimized execution process selected from a plurality of predefined execution processes. Finally, the reformulated query and matching optimized execution process are provided as an optimized version of the original crowd-sourced poll for execution via a computer-based crowd-sourcing backend.

The optimizations enabled by various features of the Poll Optimizer have been observed to improve poll performance by reducing factors such as completion times, monetary costs, and error rates of polls. Consequently, various features of the Poll Optimizer operate to increase user efficiency while reducing error rates and monetary expense with respect to implementation of crowd-source polls via crowd-sourcing backends.

The crowd-sourcing backend is a server or cloud-based crowd-sourcing marketplace that enables requesters to coordinate use of human intelligence (i.e., "workers") to perform tasks. Requesters and workers can join the crowd-sourcing backend via any of a variety of network- and cloud-based systems. A requester can post a task, known as a human intelligence task (HIT), on the crowd-sourcing backend. Moreover, a worker can browse amongst existing tasks posted on the crowd-sourcing backend and complete a task, typically in exchange for a monetary payment or other forms of compensation that are set by a requester of the task. A few examples of some of the many well-known crowd-sourcing backends that may be adapted for use by the Poll Optimizer include, but are not limited to, InterPoll, Mechanical Turk, Turkit, Mob4hire, uTest, Freelancer, eLance, oDesk, Guru, Topcoder, Trada, 99design, Innocentive, CloudCrowd, Cloud-Flower, etc. Such systems are well known in the art, and will not be described herein.

For purposes of explanation, the following discussion will refer to crowd-sourced queries running on the well-known InterPoll platform. As is well known to those skilled in the art, InterPoll provides a platform for programming crowd-sourced polls. Typically, InterPoll polls may be represented as LINQ queries.

In general, the well-known Language-Integrated Query (LINQ) provides a set of features that extends powerful query capabilities to the syntax of languages such as C#, Visual Basic, etc. LINQ provides standard, easily learned patterns for querying and updating data in a way that can be extended to support potentially any kind of data store. For example, various programming applications include LINQ provider assemblies that enable the use of LINQ with .NET Framework collections, SQL Server databases, ADO.NET Datasets, XML documents, etc.

However, it should be understood that the Poll Optimizer described herein is not limited to use with LINQ-based queries and related applications, and that any crowd-sourcing backend system operational with multi-layer queries (e.g., Java Query Language (JQL)-based queries supported by JAVA, etc.) may be adapted to use various optimization features and capabilities of the Poll Optimizer as discussed herein.

1.1 System Overview

As noted above, the "Poll Optimizer," provides various techniques for optimizing crowd-sourced polling. The processes summarized above are illustrated by the general system diagram of FIG. 1. In particular, the system diagram of FIG. 1 illustrates the interrelationships between program modules for implementing various implementations of the Poll Optimizer, as described herein. Furthermore, while the system diagram of FIG. 1 illustrates a high-level view of various implementations of the Poll Optimizer, FIG. 1 is not intended to provide an exhaustive or complete illustration of every possible implementation of the Poll Optimizer as described throughout this document.

In addition, it should be noted that any boxes and interconnections between boxes that may be represented by broken or dashed lines in FIG. 1 represent alternate implementations of the Poll Optimizer described herein, and that any or all of these alternate implementations, as described below, may be used in combination with other alternate implementations that are described throughout this document.

In general, as illustrated by FIG. 1, the processes enabled by the Poll Optimizer begin operation by applying a query input module 100 that receives, builds, or otherwise defines an initial input query representing a crowd-sourced poll 105 coded as a multi-layer structure. In various implementations a requester user interface module 110 is provided to allow query requestors (e.g., users creating or administering crowd-sourced polls) to define or set various poll parameters, including, but not limited to, worker qualifications, query questions, payment or reward offered, poll time limits, etc.

A query reduction module 115 then iteratively reduces the multi-layer structure of the input query to construct a reformulated query 120. In various implementations, the iterative reduction of the query is performed by any combination of query flattening 125, query splitting 130, and/or common subexpression elimination 135. Once the reformulated query 120 has been constructed, it is provided to an execution process selection module 140 that automatically matches the reformulated query to an optimized execution process. These optimized execution processes include, but are not limited to, post filtering based execution processes, qualification-based invitations, multi-choice qualifications, etc. A crowd-sourcing backend module 145 then applies any desired crowd-sourcing backend to execute the combination of the reformulated query 120 and matching execution process as an optimized version of the crowd-sourced poll 105 that is presented to a worker pool 150.

In various implementations, an optional rebalancing module 155 automatically adapts worker payment to balance workers in poll branches (e.g., increase or decrease payment to particular subgroups of workers to increase or decrease participation of workers to obtain a balanced representation of workers). Note that these concepts are described in further detail herein (e.g., Section 2.4).

In various implementations, an optional panel building module 160 automatically constructs one or more panels 165 of prequalified workers via an iterative process. Note that these concepts are described in further detail herein (e.g., Section 2.5).

2.0 Operational Details of the Poll Optimizer

The above-described program modules are employed for implementing various implementations of the Poll Optimizer. As summarized above, the Poll Optimizer provides various techniques for optimizing crowd-sourced polling. The following sections provide a detailed discussion of the operation of various implementations of the Poll Optimizer, and of exemplary methods for implementing the program modules described in Section 1 with respect to FIG. 1. In particular, the following sections provides examples and operational details of various implementations of the Poll Optimizer, including:

An operational overview of the Poll Optimizer;
Tree rewriting optimizations;
Yield optimizations;
Query rebalancing; and
Automated panel building.

2.1 Operational Overview

As noted above, the Poll Optimizer-based processes described herein provide various techniques for optimizing crowd-sourced polls. The optimizations enabled by various features of the Poll Optimizer have been observed to improve poll performance by reducing factors such as completion times, monetary costs, and error rates of polls. Consequently, various features of the Poll Optimizer operate to increase user efficiency while reducing error rates and monetary expense with respect to implementation of crowd-source polls via crowd-sourcing backends.

In various implementations, the Poll Optimizer performs any combination of static optimizations (e.g., query flattening, query splitting, and common subexpression elimination) of queries formatted using multi-layer structures (e.g., LINQ-based queries, JQL based queries, etc.). Further, in various implementations, runtime yield optimizations are automatically selected and implemented for specific queries based on the original or optimized query structure. Examples of these yield optimizations include separating qualifying questions (e.g., selecting users that are qualified to answer the query) and running queries in stages to reduce the cost of surveys with low yields.

Advantageously, the reductions in overall cost for running a query provided by various features of the Poll Optimizer allows survey makers (e.g., requesters) with a low budget to run crowd-sourced queries that may have been prohibitively expensive prior to optimization by the Poll Optimizer. Further, these reductions in cost enable survey makers to 1) request more samples and/or 2) run their surveys more frequently while maintaining the same budget.

In further implementations, the Poll Optimizer provides various techniques that enable re-balancing of queries that consider pairs (or larger groups) of people (e.g., equal numbers of men and women, numbers of college freshmen gender matched to regional census estimates, etc.). Advantageously, such balancing helps to reduce the amount of wasted effort (e.g., full queries presented to unqualified or non-target workers) by targeting queries to persons qualified to answer the queries while also reducing overall query completion times (i.e., overall query running time).

Advantageously, by reducing query running times, survey makers are provided the opportunity to refine survey questions (to achieve a particular result) between survey iterations with much shorter turn-around times between each iteration. For example, consider the case where a requester previously waited a week for a survey to complete only to discover that they need to reformulate their questions and run them again, while the optimized survey provided by the Poll Optimizer may complete in a single day. Clearly, such features increase user efficiency in obtaining survey results in shortened periods of time.

In additional implementations, the Poll Optimizer provides various automated techniques for constructing representative panels (of persons meeting predefined criteria) in order to reduce error rates and margins of error and to minimize wasted efforts in completing those surveys. Further, in various implementations, construction of representative panels also includes various techniques for unbiasing surveys.

For purposes of explanation and discussion, several simple examples of LINQ-based queries implemented using the Interpoll system are provided below. For example, a simple poll (coded in the LINQ language) directed towards Liberal Arts majors may be performed as illustrated by the query shown in Table 1:

TABLE 1

LINQ-Based Query Example #1

```
1  var people = new MTurkQueryable<Person>(true, 5, 100, 2);
2  var LiberalArtsPairs = from person in people
3     where person.Employment == Employment.STUDENT
4     select new {
5        Person = person,
6        Value = person.PoseQuestion<bool>(
7           "Are you a Liberal Arts major?")
8     },
9  Income = person.Income;
```

The first line of Query Example #1 above obtains a handle to a population of users, in this case obtained from Mechanical Turk (i.e., MTurkQueryable), although, as noted above, the Poll Optimizer is fully capable of being implemented with any crowd-sourcing backend. The poll in this example continues by determining whether each particular person being asked from the pool of people (e.g., crowd-sourced workers) is a student (i.e., the "where" clause on line 3 ensures that only query students are queried. Then, for students, the poll asks that person whether they are a Liberal Arts major (with the answer represented by a yes/no Boolean). Finally, the income of each person is associated with the record for each person. In other words, the poll of the preceding example is designed to ask students if they study Liberal Arts, thereby producing an iterator of (Student, bool) pairs represented in .NET as IEnumerable.

Another simple poll directed towards counting a percentage of Liberal Arts majors given the result of the LiberalArtsPairs variable of Query Example #1 is presented below in Table 2 as Query Example #2. For example, given LiberalArtsPairs, it is possible to do a subsequent operation on the result, such as, for example, printing out all pairs or using the Count operation to count a percentage of the Liberal Arts majors within the previously collected population, as illustrated by line 5 of the following LINQ-based code shown in Table 2:

TABLE 2

LINQ-Based Query Example #2

```
1  var LibralArtMajorsCount =
2      (from pair in LiberalArtsPairs
3      where pair.Value == true
4      select person).Count( );
5  var percentage = 100.0*LibralArtMajorsCount /
   LiberalArtsPairs.Count( );
```

In yet another simple example of a LINQ-based query, computations may be performed with uncertain data, as illustrated by the query shown in Table 3 as Query Example #3:

TABLE 3

LINQ-Based Query Example #3

```
1   var LiberalArtWomen = from person in people
2       where person.Gender == Gender.FEMALE
3       where person.Employment == Employment.STUDENT
4       select person.PoseQuestion<bool>("Are you a liberal arts
        major?");
5
6   var LiberalArtMen = from person in people
7       where person.Gender == Gender.MALE
8       where person.Employment == Employment.STUDENT
9       select person.PoseQuestion<bool>("Are you a liberal arts
        major?");
10
11  var femaleVar = femaleSample.ToRandomVariable( );
12  var maleVar = maleSampleList.ToRandomVariable( );
13  if (femaleVar > maleVar)
14      Console.WriteLine("More female liberal arts majors.");
15  else
16      Console.WriteLine("More male liberal arts majors.");
```

In Query Example #3, the Boolean output of the posted question is converted to random variables (see lines 11 and 12). Then, the code compares these random variables on line 13. Note that the implicit>comparison on line 13 compiles to a t-test on femaleVar and maleVar when interpreting the LINQ code.

2.2 Tree Rewriting Optimizations

In general, as noted above, the static optimizations provided by various features of the Poll Optimizer operate on multi-layer query structures that include, but are not limited to LINQ-based query trees. Examples of static optimizations enabled by various features of the Poll Optimizer include, but are not limited to, query flattening, query splitting, and common subexpression elimination.

Multi-layer query structures such as LINQ include support for intricate providers, which allow the semantics of query processing to be redefined in significant ways. As is well-known to those skilled in the art, a LINQ provider is software that implements interfaces such as the IQueryProvider and IQueryable interfaces (or any other interface that defines an appropriate Select method) for a particular data store. In other words, such providers allow LINQ queries to be written against particular data stores. For example, a LINQ to XML provider allows LINQ queries against XML documents. Advantageously, using different LINQ providers enables the Poll Optimizer to decide on an evaluation strategy at runtime or change evaluation strategies as more data is received based on profiling.

Additionally, LINQ queries seamlessly connect SQL-like queries over human-generated data with the rest of the programs with all its traditional constructs such as if's, while's, function calls, etc. Note that regular constructs such as Boolean tests and arithmetic operations may be embedded within, and potentially outside, LINQ code.

More specifically, LINQ enables programmers to access the internal parts in each LINQ query via LINQ expressions. Each LINQ query is translated into an expression abstract syntax tree (AST), which can be rewritten by LINQ providers. Systems such as InterPoll operate by providing an appropriate set of visitors (i.e., computer-based processes for separating an algorithm from an object structure on which it operates) to rewrite LINQ query trees to both optimize them and also connect query trees to the actual data which comes from Mechanical Turk (or other crowdsourcing backend). The latter kind of "plumbing" is responsible for obtaining Mechanical Turk data in XML format and then at runtime parsing and validating it, and embedding the data it into type-safe runtime data structures. The process of expression tree rewriting is done via LINQ visitor patterns that override one of more methods in the visitor parent class. A schematic example of such a method for rewriting LINQ expression trees is shown by the LINQ code illustrated in Table 4:

TABLE 4

Rewriting LINQ Expression Trees

```
1   protected override Expression VisitMethodCall
2       (MethodCallExpression node)
3   {
4       var methodName = node.Method.Name;
5       switch(methodName) {
6           case "Select" :
7               ...
8               return <newly-constructed-node>;
9           case "Where" :
10              ...
11              return <newly-constructed-node>;
12      }
13  }
```

Table 5, illustrated below, provides a small exemplary context free grammar (e.g., a "BNF") for LINQ expressions that may be optimized by the Poll Optimizer. Note that the BNF provided by Table 4 is not intended to limit the query expressions that may be optimized, and is provided only for purposes of discussion.

TABLE 5

Exemplary BNF for Optimizable LINQ Expressions

| | | |
|---|---|---|
| collection | ::= | from var in collection [where boolExpr] select getter |
| collection | ::= | from var in collection [where bool Expr] select creation |
| collection | ::= | Set |
| getter | ::= | var. field\|var..getter(args) |
| creation | ::= | new struct |
| struct | ::= | {alias[,...]} |
| alias | ::= | name == getter |
| boolExpr | ::= | true \|false\| getter compOp const\| boolExpr logicalOp boolExpr \| !boolExpr |
| compOp | ::= | == \| !! = \| > \| >= \| < \| <= |
| const | ::= | "..."\|0,1, ... \| ... |
| logicalOp | ::= | && \| \|\| |

2.2.1 Query Flattening

For purposes of explanation, simple examples of flattening (single level and multi-level) are shown below. Flattening involves elimination of inner structures by expanding them out to create simplified and optimized comparable queries. For example, the following query structure illustrates an exemplary query directed towards persons having wages higher than $4,000 and living in Washington.

```
1  from structure in
2     from person in employees
3     where person.Wage > 4000 && person.Region == "WA"
4     select new {
5        Name = person.Name,
6        Boss = person.GetBoss( ),
7        Sales = person.GetSales(42)
8     }
9  where structure.Sales.Count > 5
10 select structure.Boss;
```

The preceding query structure may be flattened as follows via single-level flattening as illustrated by the following comparable query structure:

```
1  from person in employees
2  where (person.Wage > 4000 && person.Region == "WA")
3     && (person.GetSales(42).Count > 5)
4  select person.GetBoss( );
``` which yields the outcome as the original query shown above after combining the two where clauses.

Similarly, the following query structure again illustrates an exemplary query directed towards persons having wages higher than $4,000 and living in Washington, with the query being further limited by quarterly sales periods (i.e., Q1-Q4):

```
1  from structure in
2     from person in employees
3     where person.Wage > 4000 && person.Region == "WA"
4     select new {
5        Name = person.Name,
6        Boss = person.GetBoss( ),
7        Sales = person.GetSales(42),
8        Winter = person.Q1 + structure.Q2,
9        Summer = person.Q3 + structure.Q4 }
10 where structure.Sales.Count > 5
11 select Employee.GetMin(structure.Winter, structure.Summer);
```

The preceding query structure may be flattened as follows via multi-level flattening as illustrated by the following comparable query structure:

```
1  from person in employees
2  where (person.Wage > 4000 && person.Region == "WA")
3     && (person.GetSales(42).Count > 5 && person .Q1 > 10)
4  select person.Q4;
``` which yields the outcome as the original query shown above after combining the two where clauses.

The algorithm in Table 6 illustrates an exemplary implementation for flattening queries. The trivial base case is when the LINQ expression is of depth one (i.e., single-level flattening). Otherwise, the inner expression in the from clause is first flattened recursively, and then the process repeats for the outer layer (i.e., multi-level flattening). The flattening process operates to remove intermediate structures that are created. Those anonymous structures define fields, and, as such, the replacement process is focused on expressions with fields, as in var.field. Each such expression is replaced by effectively inlining expressions used in the definition of that field.

The output of this flattening process is an optimized LINQ expression (L') where the from clause is that of the inner expression, the where clause is the logical AND combination of the where from the inner expression and the outer one (after all the replacements), and the select clause is the outer one (after all the replacements)

TABLE 6

Algorithm "Flatten" for Optimizing LINQ Expressions

```
1   function Flatten(LinqExprL)
2   Returns: LinqExprL'
3
4   // Base case
5   if L.Depth = 1
7      then L' = L
8   else
9      Inner = Flatten(L.From)
10     OuterWhere = L.Where
11     OuterSelect = L.Select
12     // New types can define fields but not functions
13     for all var.field ∈ OuterWhere ∪OuterSelect do
14        if Inner.Defines(typeof var) then
15           // Get the expression that initializes field
16           Replacement = Inner.Select.ExprFor(field)
17           Swap(var.field,Replacement)
18        end if
19     end for
20     // OuterWhere and OuterSelect have now been altered
21     L'.From = Inner.From
22     L'.Where = Inner.Where ∧ OuterWhere
23     L'.Select = OuterSelect
24  end if
```

2.2.2 Query Splitting

In general, query splitting operates to rewrite a LINQ expression in such a way that general and demographic questions that filter based on demographic characteristics are gathered in the where clause, with the remaining questions being gathered in the select clause. For example, the end-result might look like the following:

```
1  from person in people
2  where person.PoseQuestion("...") > 100 && person.Gender =
      "MALE"
3  select new {
4     Q1 = person.PoseQuestion("..."),
5     Q2 = person.PoseQuestion("..."),
6     Education = person.Education
7  }
```

The algorithm in Table 7 illustrates an exemplary implementation for splitting queries. First, a single set with all the general and demographic questions present in the LINQ expression is created. Then, the expression is flattened so that there is one where clause, and from that a second set of filter questions is created. Finally, in the optimized LINQ expression produced by query splitting, the select clause has the questions present in the initial expression that are not already handled in the where clause.

TABLE 7

Algorithm "SplitQuery" for Optimizing LINQ Expressions

```
1  function SplitQuery(LinqExpr L)
2  Returns: LinqExpr L'
3
4  AllQuestions = L.Questions
5  AllDemographics = L.Demographics
6  Flat = Flatten(L)
7  FilterQuestions = Flat.Where.Questions
```

TABLE 7-continued

Algorithm "SplitQuery" for Optimizing LINQ Expressions

```
 8   FilterDemographics = Flat.Where.Demographics
 9   NewStruct = new{
10       Questions = AllQuestions \ FilterQuestions,
11       Demographics = AllDemographics \ FilterDemographics}
12   L'.From = Flat.From
13   L'.Where = Flat.Where
14   L'.Select = NewStruct
```

2.2.3 Common Subexpression Elimination

Common subexpressions elimination identify common subexpressions in two or more LINQ expressions in a LINQ-based query and then merges the inputs in such a way that each LINQ expression references the same common subexpression (instead of having two or more different occurrences). The matching is done on the structure of LINQ subtrees. Equality is established by computing hash functions. Computing the hash values for leaf nodes is trivial, since they will hold constant values. Computing the hash values for internal nodes is done by combining the hash values of every child node.

The algorithm in Table 8 illustrates an exemplary implementation for performing common subexpression elimination for the case of two LINQ expressions, $L_1$ and $L_2$. In general, this process begins with a preprocessing step where variable names are normalized in each LINQ expression. Next, each expression is traversed and each subexpression is assigned an ID in a way that ensures that syntactically equivalent expressions will have the same ID assigned to them. Subsequently, those IDs are used in order to identify common subexpressions that can be merged so there is only on occurrence in the initial LINQ expressions, with the resulting LINQ query representing an optimized version of the original query.

TABLE 8

Algorithm "CommonSubs" for Optimizing LINQ Expressions

```
 1   function CommonSubs(LinqExpr L1, LinqExpr L2)
 2   Returns: LinqExpr L2'
 3
 4   // Rewrite both expressions to normalize variable names
 5   L1 = NormalizeVariableNames(L1)
 6   L2 = NormalizeVariableNames(L2)
 7   // Create Hash Maps by mapping each subexpression to an ID
 8   H1 = CreateHashes(L1)
 9   H2 = CreateHashes(L2)
10   // Gather expressions with the same ID
11   Common = H1 ∩ H2
12   // Expr1 in L1 has the same ID as Expr2 in L2
13   for all e ∈ Common do
14       e1 = H1[e.Key]
15       e2 = H2[e.Key]
16       Replacements[e1] = e2
17   end for
18   // Using the mapping above, replace subexpressions in L2 with ones
         from L1
19   L2' = MakeReplacements(Replacements,L2)
```

2.3 Yield Optimizations

One of the issues faced in many surveys is the question of low-yield. In particular, while a large number of people can be polled, in the case of low-yield, only a small subset of those pulled will meet the criteria of the filter questions of the poll. For instance, a particular query may be interested in only females or only in people who are employed full-time and over the age of 40. Similarly, a query may be interested in surveying only those who are iPhone users. All of these are examples of qualifying questions (also referred to as filter questions). These types of filter questions are widely used in marketing, for example, where one is interested in only a well-defined group and its response to a particular product, for instance. When it comes to query performance, having narrow qualifications both creates queries that both take a great deal of time and are costly. Advantageously, various features of the Poll Optimizer address both of these issues by optimizing polls in a way that reduces both completion time and cost by increasing the efficiency of otherwise low-yield queries.

The following paragraphs describe various execution strategies for running surveys with qualifying questions to increase yield for useful completes. Note that for purposes of discussion, it is also assumed that the query has been pre-processed using some or all of the query optimizations described above (e.g., query flattening, query splitting, and common subexpression elimination) although the yield optimizations may optionally be performed without first optimizing the query. In other words, in various implementations, the Poll Optimizer assigns an execution strategy to already optimized queries to further optimize those queries.

Each execution strategy is responsible for using a crowd-sourcing backend for creating a survey, polling for results, making dynamic changes to the survey (e.g., changing the number of crowd-sourced workers that take part or the amount they are paid) and finally presenting the results to the requester. In various implementations, during execution, runtime metrics may be recorded. For instance, the current yield of the query, the times when each crowd-sourced worker took the survey, etc. Each execution strategy is also supplied with an execution policy, which applies the current runtime metrics to make decisions about the remainder of the query execution. For instance, how many more crowd-sourced workers to request for the survey or if the payment amount should change.

In other words, in various implementations, the Poll Optimizer collects runtime statistics at each stage of the query. These statistics may include, but are not limited to, number of query completions, yield, submission time history, reward or payment amounts, target demand, etc. Given the gathered runtime statistics, the Poll optimizer then determines factors including, but not limited to, changes in the total demand, changes in the reward amount, timeout of the HIT, decisions about suspending or resuming the HIT, etc. This creates a feedback loop allowing the Poll Optimizer to monitor execution in near-real time and to respond to that monitoring by adjusting or adapting query execution processes and strategies to improve query performance.

2.3.1 Default Execution Strategy

A default execution strategy of post-filtering once the data has been obtained from crowd-sourced workers can be wasteful for low-yield queries, since the crowd-sourcing backend will typically initiate payment for everyone who takes the poll, not only for those whose completes are useful to the requester. For example, if the yield of useful completes is approximately 10%, the cost of running the entire query (to 100% completion) may approach a ten-fold increase in cost relative to a similar query where all completes are useful. In other words, the default execution strategy involves asking a larger number of workers and then post-filtering to include only those that match the qualification criteria.

2.3.2 Two-Stage Execution Strategy

A two-stage execution strategy involves separating the query into two HIT stages. The first HIT stage is designed to determine whether a crowd-sourced worker matches the criteria of the filter questions of the poll (e.g., whether the worker is qualified). If so, the worker is directed to a second-stage HIT where she can complete the rest of the survey. Note also that this same concept may be expanded to three or more stages to progressively weed out unacceptable workers. At each stage of the qualification process, the Poll Optimizer ensures that an unqualified worker will not be able to accept the second (or subsequent) stage HIT. For example, in various implementations, the crowd-sourcing backend may notify (e.g., via email, text message, etc.) workers that qualified in the first stage that they may now respond to the second stage.

One advantage of this approach is the ability to balance the query payments to crowd-sourced workers in the two stages. For instance, relatively small payments can be made to crowd-sourced workers for completing the first-stage qualifying task. Crowd-sourced workers matching the criteria of the filter questions may then be paid higher amounts to complete the second-stage task. Note that the questions in the first stage can be specific (e.g., age, gender, income, etc.), or they can be quite arbitrary. For instance, workers may be asked to capture their attitude towards a presidential campaign in 200 characters or less, with the result of the response then being passed to a sentiment analysis algorithm. This type of sentiment analysis program can then determine whether those workers qualify for the next stage of the survey (e.g., pass workers that are happy about the results of the last election to the second stage).

2.3.3 Multi-Choice Execution Strategy

An additional qualification-based strategy involves adapting a qualification mechanism available in crowdsourcing backends, which allows qualification of crowd-sourced workers based on multiple-choice questions. While this approach is less general than the two-stage strategy described above, one advantage is that the crowdsourcing backends are not required to pay for crowd-sourced workers who fail to qualify.

2.3.4 Evaluating Costs for Selecting the Execution Strategy

The costs associated with each of the three execution strategies described in the preceding paragraphs be captured by the following cost equation, which summarizes the expected cost of obtaining N qualified workers:

$$E[C_N] = N \times \left[\frac{c_1}{y_1} + \frac{c_2}{y_2}\right]$$

where $c_1$ is the first-stage cost per worker and $c_2$ is the second-stage cost per worker who reaches that stage. Finally, $y_1$ is the yield, which may be assumed to be independent of $c_1$, $c_2$, or other parameters and also constant, e.g., not changing as the survey continues to run or depending on the hour of the day. $y_2$ is the yield for the second stage: e.g., the number of crowd-sourced workers of the ones eligible for the second stage complete it.

For the default strategy, there is no second stage, so the equation reduces to $E[C_N]=N \times c_1/y_1$. For the multi-choice qualification-based strategy, there is no extra cost to the first stage, so the equation reduces to just $E[C_N]=N \times c_2/y_2$. For the two-stage strategy, the cost is dependent on the yields. In various tested implementations, the multi-choice qualification execution strategy has been observed to reduce expenses the most relative to the two other execution strategies. However, the default execution strategy has been observed to complete considerably faster than either of the other two execution strategies given the same query. As such, the requester may rank options such as query cost and query completion times via a user interface or the like presented via the crowdsourcing backend. In various implementations, the Poll Optimizer may then select one of the execution strategies that most closely match the requester preferences as to cost and completion times for the query.

2.4 Query Rebalancing

Some crowdsourcing backends, such as InterPoll for example, support answering decision questions of the form $r_1$ boolOp $r_2$, where both $r_1$ and $r_2$ are random variables obtained from segments of the population (e.g., $r_1$ may represent a male branch of the worker population and $r_2$ may represent a female branch of the worker population). A simple example of this type of query is shown above in Query Example #3, which compares the number of male and female Liberal Arts majors.

To answer such decision queries, systems such as InterPoll repeatedly consider pairs of crowd-sourced workers from each of the two categories (e.g., male and female) and then perform a sequential probability ratio test to decide how many samples to request. However, a common issue is that the two branches of the comparison are often unbalanced (e.g., there is likely an unequal number of males and females in the sample population, or unequal numbers of workers who are rich or poor, or who own and do not own dogs, etc.).

For purposes of discussion, assume that $r_1$ produces results faster than $r_2$. If the crowdsourcing backend pays for every worker from $r_1$ and $r_2$, and there are too many workers from $r_1$, this will result in paying for too many samples (e.g., excess $r_1$ samples) that are not useful until a sufficient number of samples from $r_2$ have been obtained. This can result in the creation of a bottleneck in terms of speed with which pairwise tests between matched samples of $r_1$ and $r_2$ can be considered.

In various implementations, the Poll Optimizer addresses such issues by providing various solutions for re-balancing the branches of such tests to reduce query bottlenecks and costs. In various implementations, the Poll Optimizer automatically adapts payments to one or both branches in a way that attracts more workers to the branch of the decision query that is too scarce (or that reduces workers in the branch having an excess of workers). For example, increasing payments tends to increase the number of workers, while decreasing payments tends to reduce the number of workers. Such increases and decreases may be made on a sliding scale that automatically adapts to the number of workers (and optionally to requester budget constraints) in order to obtain a more balanced mix between the two branches.

Note that although the preceding discussion refers to two branches, three or more branches of worker types may be considered. For example, a particular query may consider four "branches" of highest education levels (with an optional predetermined percentage of workers for each branch), including 1) high school graduate (58%), 2) college graduate with Bachelor's degree (25%), 3) college graduate with Master's degree (14%), and 4) college graduate with PhD (3%).

In other words, in various implementations, the Poll Optimizer automatically determines relative numbers of workers for each of two or more branches of the crowd-sourced poll during execution of the poll via the crowdsourcing backend. The Poll Optimizer then automatically adapts payment offers (e.g., increases payment offers or rewards) to workers meeting qualifications of under-represented branches to increase numbers of qualified workers in those under-represented branches. Similarly, in various implementations, the Poll Optimizer automatically adapts payment offers (e.g., decreases payment offers or rewards) to workers meeting qualifications of over-represented branches to decrease numbers of qualified workers in over-represented branches.

Further, in various implementations, query rebalancing may be combined with any of the aforementioned yield optimizations described above (e.g., worker qualification tests such as the aforementioned two-stage execution strategy or the multi-choice execution strategy.

2.5 Automated Panel Building

Typically, requesters desire to run opinion polls that accurately reflect the opinions of particular population groups in relatively large geographic regions. However, when workers participating in such groups are not representative of the demographics of the targeted population group, the results obtained from the poll may be not adequately reflect the opinions of the targeted population group. One way in which such concerns can be alleviated is to construct representative panels of pre-qualified workers that are available to be called to answer new polls. For example, a panel comprising approximately equal numbers of men and women with college degrees that are employed and earning an income within some specified range may be a desirable panel for particular marketing purposes.

In cases where representative panels are not available, the concept of unbiasing has sometimes been used to weight responses returned by workers in an attempt to replicate the results expected from balanced panels. Unfortunately, it has been observed that unbiasing unrepresentative samples (relative to the target population) typically increases statistical confidence intervals (i.e., the results tend to be statistically imprecise). Another concern regarding the use of unbiasing is the inability to directly link the data that is obtained to individuals answering the questions. This may be of particular concern where the requester posting the query wants to ask some follow-up questions of particular segment of the responders.

As such, rather than attempting to unbias unrepresentative samples, in various implementations, the Poll Optimizer provides various techniques for automatically constructing representative panels of workers that may then be called on-demand to respond to queries for which the panel members have been pre-qualified.

More specifically, in various implementations, the Poll Optimizer automatically pre-builds one or more panels of workers whose demographic characteristics are pre-obtained and whose demographic profiles match that of the general population (or some particular target population). Depending upon the target demographics, this may be a difficult task. For example, workers above the age of 75 are typically difficult to find in the pool of crowd-sourced workers. The same is true of workers having an annual income in excess of $100,000. Finding workers who possess both of these characteristics is that much more difficult. However, where one or more panels meeting particular qualifications can be constructed prior to running polls, the workers on those panels may then be used for running polls as they arise. Advantageously, access to such panels allows poll results to be quickly obtained from on-demand pre-constructed and responsive panels. However, it should be noted that for panels having uncommon qualifications (e.g., over 75 years of age with an income in excess of $75,000), panel construction may take a long time.

The algorithm in Table 9 illustrates an exemplary implementation for iteratively constructing representative panels that may then be called upon to respond to new queries. In particular, algorithm "BuildPanel" in Table 9 shows how a panel can be built iteratively, over a number of long-running generations. The output of the algorithm is a panel P of workers marked with a particular qualification $Q_P$. Once the qualification $Q_P$ has been granted to them, these workers can be invited to join or respond to a particular query or poll. At each step of the algorithm, the currently running HIT is queried for new workers, and the set of unrepresented categories, U, is updated. In various implementations, an additional function, e.g., FindUnrepresented(D) (not shown in Table 9) identifies categories that are not adequately represented with respect to the provided target distribution D (e.g., census data in the country or region of interest). Whenever the set of unrepresented categories is reduced (i.e., check on line 21), a generation counter, G, is incremented, and a new HIT (directed towards the qualification of interest) is automatically created to collect more samples. A dummy HIT is created with an increasingly narrow qualification test for missing categories. As time progresses and more categories are completed, the current HIT is stopped and a new one is created with only the categories that are still incomplete.

TABLE 9

Algorithm "BuildPanel" for Construction of Worker Panels

```
1   function BuildPanel(D)
2   Returns: panel P
3
4       // Panel qualification mapping workers to categories
5       Q_P = CreateQualification( )
6       // Qualification mapping workers to generation
7       Q_R = CreateQualification(autogrant = true)
8       U = FindUnrepresented(D,Q_P) // Unrepresented categories
9       G = 1
10      Q_H = CreateQualTest(U,Q_R)
11      H = CreateAndStartHit(Q_H) // HIT is created on crowd-sourcing
        backend
12      while U ≠ Ø do
13          U' = U
14          sleep(1 hour) // Optional delay before starting new HIT
15          workers = H.GetWorkers( )
16          // Move new workers to panel qualification
17          AssignQualification(workers,Q_P)
18          // mark them so that they don't retake subsequent hits
19          AssignQualification(workers,Q_R,G)
20          U = FindUnrepresented(D,Q_P)
21          if U ≠ U' ∧ U ≠ Ø then
22              Q_H.Dispose( )
23              H.Stop( )
24              // Re-create qual-test and HIT for missing categories
25              G = G + 1 // Next generation
26              Q_H = CreateQualTest(U,Q_R)
27              H = CreateAndStartHit(Q_H)
28          end if
29      end while
30      P = BuildPanel(Q_P)
```

3.0 Operational Summary of the Poll Optimizer

Figure 2:
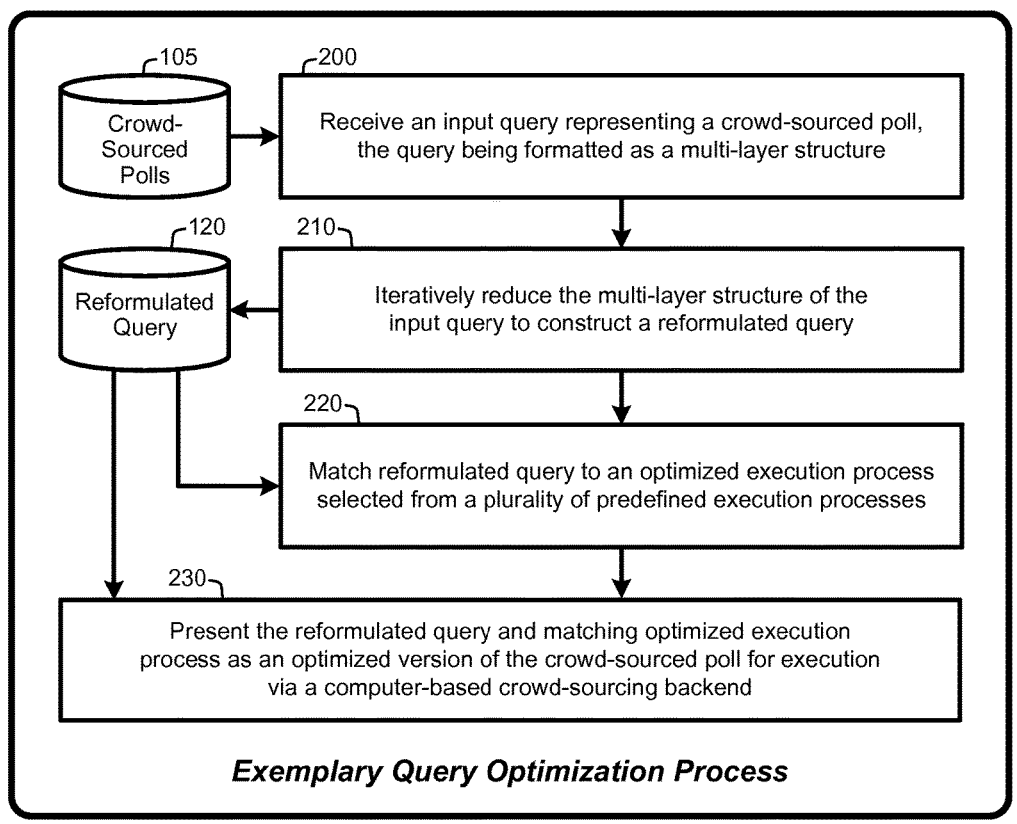
FIG. 2 provides a general system flow diagram that illustrates exemplary methods for effecting various implementations of the Poll Optimizer, as described herein.
Figure 3:
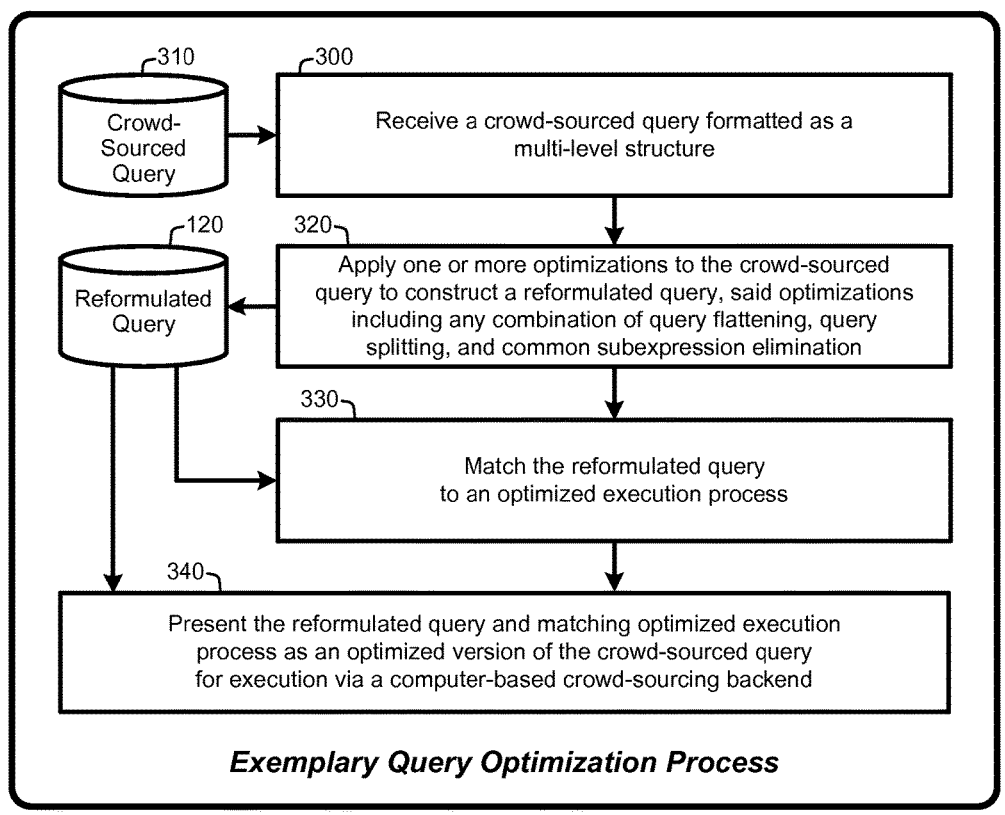
FIG. 3 provides a general system flow diagram that illustrates exemplary methods for effecting various implementations of the Poll Optimizer, as described herein.
Figure 4:
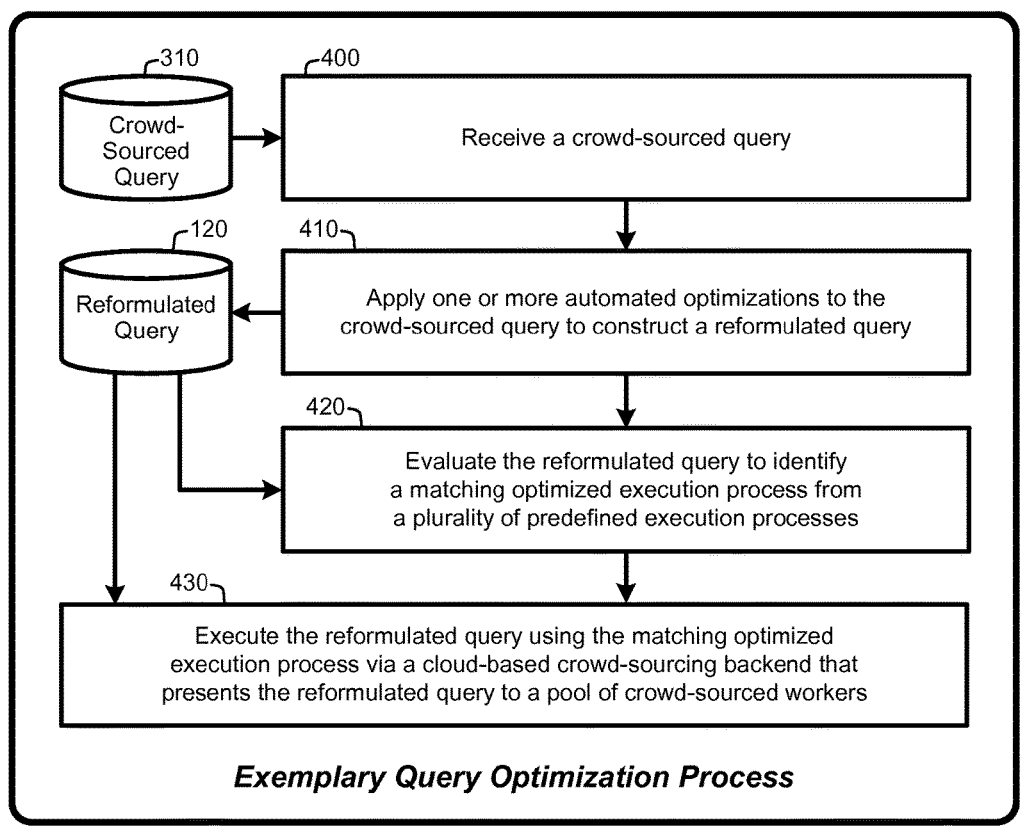
FIG. 4 provides a general system flow diagram that illustrates exemplary methods for effecting various implementations of the Poll Optimizer, as described herein.

The processes described above with respect to FIG. 1, and in further view of the detailed description provided above in Sections 1 and 2, are illustrated by the general operational flow diagrams of FIG. 2 through FIG. 4. In particular, FIG. 2 through FIG. 4 provide exemplary operational flow diagrams that summarize the operation of various implementations of the Poll Optimizer. Note that FIG. 2 through FIG. 4 are not intended to provide exhaustive representations of all of the various implementations of the Poll Optimizer described herein, and that the implementations represented in these figures are provided only for purposes of explanation.

In general, as illustrated by FIG. 2, various implementations of the Poll Optimizer begin operation by receiving (200) an input query representing a crowd-sourced poll 105, the query being formatted as a multi-layer structure. The Poll Optimizer then iteratively reduces (210) the multi-layer structure of the input query to construct a reformulated query 120. Next, the Poll Optimizer matches (220) the reformulated query 120 to an optimized execution process selected from a plurality of predefined execution processes. Finally, the Poll optimizer presents (230) the reformulated query 120 and matching optimized execution process as an optimized version of the crowd-sourced poll for execution via a computer-based crowd-sourcing backend.

Similarly, as illustrated by FIG. 3, in various implementations, the Poll Optimizer begins operation by receiving (300) a crowd-sourced query 310 formatted as a multi-layer structure. The Poll Optimizer then applies (320) one or more optimizations to the crowd-sourced query to construct a reformulated query 120. These optimizations include any combination of query flattening, query splitting, and common subexpression elimination. The Poll Optimizer then matches (330) the reformulated query 120 to an optimized execution process. Finally, the Poll Optimizer presents 340 the reformulated query 120 and matching optimized execution process as an optimized version of the crowd-sourced query for execution via a computer-based crowd-sourcing backend.

In yet another implementation, the Poll Optimizer begins operation by receiving (400) a crowd sourced query 310. The Poll Optimizer then applies (410) one or more automated optimizations to the crowd-sourced query 310 to construct a reformulated query 120. The Poll Optimizer then evaluates (420) the reformulated query 120 to identify a matching optimized execution process from a plurality of predefined execution processes. Finally, the Poll Optimizer executes (430) the reformulated query 120 using the matching optimized execution process via a cloud-based crowd-sourcing backend that presents the reformulated query to a pool of crowd-sourced workers.

4.0 Exemplary Implementations of the Poll Optimizer

The following paragraphs summarize various examples of implementations that may be claimed in the present document. However, it should be understood that the implementations summarized below are not intended to limit the subject matter that may be claimed in view of the detailed description of the Poll Optimizer. Further, any or all of the implementations summarized below may be claimed in any desired combination with some or all of the implementations described throughout the detailed description and any implementations illustrated in one or more of the figures, and any other implementations and examples described below. In addition, it should be noted that the following implementations and examples are intended to be understood in view of the detailed description and figures described throughout this document.

In various implementations, a Poll Optimizer is implemented by means, processes or techniques for optimizing crowd-sourced polls to reduce or minimize various combinations of factors that include, but are not limited to, poll completion times, poll costs, and poll error rates. As such, the optimizations enabled by various features of the Poll Optimizer have been observed to improve poll performance by reducing factors such as completion times, monetary costs, and error rates of polls. Consequently, various features of the Poll Optimizer operate to increase user efficiency while reducing error rates and monetary expense with respect to implementation of crowd-source polls via crowd-sourcing backends.

As a first example, in various implementations, a method for optimizing computer-based crowd-sourced polling is provided via means, processes or techniques for receiving an input query representing a crowd-sourced poll, the query being formatted as a multi-layer structure. In various implementations, the method then iteratively reducing the multi-layer structure of the input query to construct a reformulated query. In various implementations, the method then matches the reformulated query to an optimized execution process selected from a plurality of predefined execution processes. Finally, in various implementations, the method presents the reformulated query and matching optimized execution process as an optimized version of the crowd-sourced poll for execution via a computer-based crowd-sourcing backend.

As a second example, in various implementations, the first example is further modified via means, processes or techniques for iteratively reducing the multi-layer structure of the input query further by removing intermediate structures in the input query by recursively flattening expressions of each of a plurality of clauses in each layer and then logically combining like clauses between different layers of the input query, thereby constructing the reformulated query.

As a third example, in various implementations, any of the first example and the second example are further modified via means, processes or techniques for iteratively reducing the multi-layer structure of the input query by: creating a first set of questions comprising general and demographic comparisons that are gathered from the input query; flattening the input query and creating a second set of questions comprising one or more filter questions extracted from the flattened query; and constructing the reformulated query from the first set of questions in combination with a subset of questions from the second set of questions that are not already addressed by the first set of questions.

As a fourth third example, in various implementations, any of the first example, the second example, and the third example, are further modified via means, processes or techniques for iteratively reducing the multi-layer structure of the input query by identifying common subexpressions in the input query and merging common subexpressions so that expressions in the input query reference merged subexpressions in place of the common subexpressions.

As a fifth example, in various implementations, any of the first example, the second example, the third example, and the fourth example are further modified via means, processes or techniques for matching the reformulated query to an optimized execution process selected from a plurality of predefined execution processes by post-filtering available crowd-sourced workers to include crowd-sourced workers matching qualifying questions extracted from the input query.

As a sixth example, in various implementations, any of the first example, the second example, the third example, the fourth example, and the fifth example, are further modified via means, processes or techniques for matching the reformulated query to an optimized execution process selected from a plurality of predefined execution processes by performing an automated process comprising that includes: querying crowd-sourced workers to determine which crowd-sourced workers match qualifying questions extracted from the input query; and inviting crowd-sourced workers that match the qualifying questions to respond to the reformulated query.

As a seventh example, in various implementations, any of the first example, the second example, the third example, the fourth example, the fifth example, and the sixth example, are further modified via means, processes or techniques for matching the reformulated query to an optimized execution process selected from a plurality of predefined execution processes further by performing an automated process that includes: presenting crowd-sourced workers with one or more multiple choice questions to determine which crowd-sourced workers match qualifying questions extracted from the input query; and inviting crowd-sourced workers that match the qualifying questions to respond to the reformulated query.

As an eighth example, in various implementations, any of the first example, the second example, the third example, the fourth example, the fifth example, the sixth example, and the seventh example, are further modified via means, processes or techniques for automatically determining relative numbers of workers for each of two or more branches of the crowd-sourced poll during execution of the poll via the crowd-sourcing backend.

As a ninth example, in various implementations, the eighth example is further modified via means, processes or techniques for automatically adapting payment offers to workers meeting qualifications of under-represented branches to increase numbers of qualified workers in those under-represented branches.

As a tenth example, in various implementations, any of the eighth example and the ninth example are further modified via means, processes or techniques for automatically adapting payment offers to workers meeting qualifications of over-represented branches to decrease numbers of qualified workers in over-represented branches.

As an eleventh example, in various implementations, any of the first example, the second example, the third example, the fourth example, the fifth example, the sixth example, the seventh example, the eighth example, the ninth example, and the tenth example, are further modified via means, processes or techniques for automatically inviting workers assigned to a pre-constructed worker panel via an automated iterative panel building process to respond the optimized version of the crowd-sourced poll via the crowd-sourcing backend.

As a twelfth example, in various implementations, a computer-implemented process is provided via means, processes or techniques for using a computer to perform process actions for receiving a crowd-sourced query formatted as a multi-layer structure. In various implementations, the computer-implemented process then applies one or more optimizations to the crowd-sourced query to construct a reformulated query, said optimizations serving to reduce a complexity of the crowd-sourced query. In various implementations, the computer-implemented process then matches the reformulated query to an optimized execution process. Finally, in various implementations, the computer-implemented process then presents the reformulated query and matching optimized execution process as an optimized version of the crowd-sourced query for execution via a computer-based crowd-sourcing backend.

As a thirteenth example, in various implementations, the twelfth example is further modified via means, processes or techniques for applying a query flattening optimization that iteratively removes intermediate structures in the crowd-sourced query by recursively flattening expressions of each of a plurality of clauses in each layer of the crowd-sourced query, and logically combines like clauses between different layers of the crowd-sourced query.

As a fourteenth example, in various implementations, any of the twelfth example and the thirteenth example are further modified via means, processes or techniques for applying a query splitting optimization that flattens the crowd-sourced query by gathering general and demographic questions that filter based on demographic characteristics into a single where clause, and gathers the remaining questions of the crowd-sourced query into a single select clause.

As a fifteenth example, in various implementations, any of the twelfth example, the thirteenth example, and the fourteenth example, are further modified via means, processes or techniques for applying a common subexpression elimination optimization that identifies common subexpressions in the input query, and merges the identified common subexpressions so that expressions in the input query reference merged subexpressions in place of the common subexpressions.

As a sixteenth example, in various implementations, any of the twelfth example, the thirteenth example, the fourteenth example, and the fifteenth example, are further modified via means, processes or techniques for matching the reformulated query to an optimized execution process further by selecting an execution process from a plurality of predefined execution processes including: post-filtering available crowd-sourced workers to include crowd-sourced workers matching qualifying questions extracted from the crowd-sourced query; inviting crowd-sourced workers that match qualifying questions extracted from the crowd-sourced query to respond to the reformulated query; and inviting crowd-sourced workers that match predetermined qualifications determined via one or more multiple choice questions to respond to the reformulated query.

As a seventeenth example, in various implementations, any of the twelfth example, the thirteenth example, the fourteenth example, the fifteenth example, and the sixteenth example, are further modified via means, processes or techniques for automatically adapting payment offers to workers meeting qualifications of under-represented branches of the crowd-sourced query to increase numbers of qualified workers in those under-represented branches, and automatically adapting payment offers to workers meeting qualifications of over-represented branches of the crowd-sourced query to decrease numbers of qualified workers in over-represented branches.

As an eighteenth example, in various implementations, a cloud-based crowd-sourced query system is provided via means, processes or techniques for applying a general purpose computing device and a computer program comprising program modules executable by the computing device that direct the computing device to receive a crowd-sourced query. In various implementations, the cloud-based crowd-sourced query system then applies one or more automated optimizations to the crowd-sourced query to construct a reformulated query. In various implementations, the cloud-based crowd-sourced query system then evaluates the reformulated query to identify a matching optimized execution process from a plurality of predefined execution processes. Finally, in various implementations, the cloud-based crowd-sourced query system then executes the reformulated query using the matching optimized execution process via a cloud-based crowd-sourcing backend that presents the reformulated query to a pool of crowd-sourced workers.

As a nineteenth example, in various implementations, the eighteenth example is further modified via means, processes or techniques for receiving the crowd-sourced query formatted as a multi-layer structure, and wherein the automated optimizations include any combination of query flattening, query splitting, and common subexpression elimination.

As a twentieth example, in various implementations, any of the eighteenth example, and the nineteenth example are further modified via means, processes or techniques for matching the reformulated query to an optimized execution process by selecting an execution process from a plurality of predefined execution processes including: post-filtering available crowd-sourced workers to include crowd-sourced workers matching qualifying questions extracted from the crowd-sourced query; inviting crowd-sourced workers that match qualifying questions extracted from the crowd-sourced query to respond to the reformulated query; and inviting crowd-sourced workers that match predetermined qualifications determined via one or more multiple choice questions to respond to the reformulated query.

5.0 Exemplary Operating Environments

Figure 5:
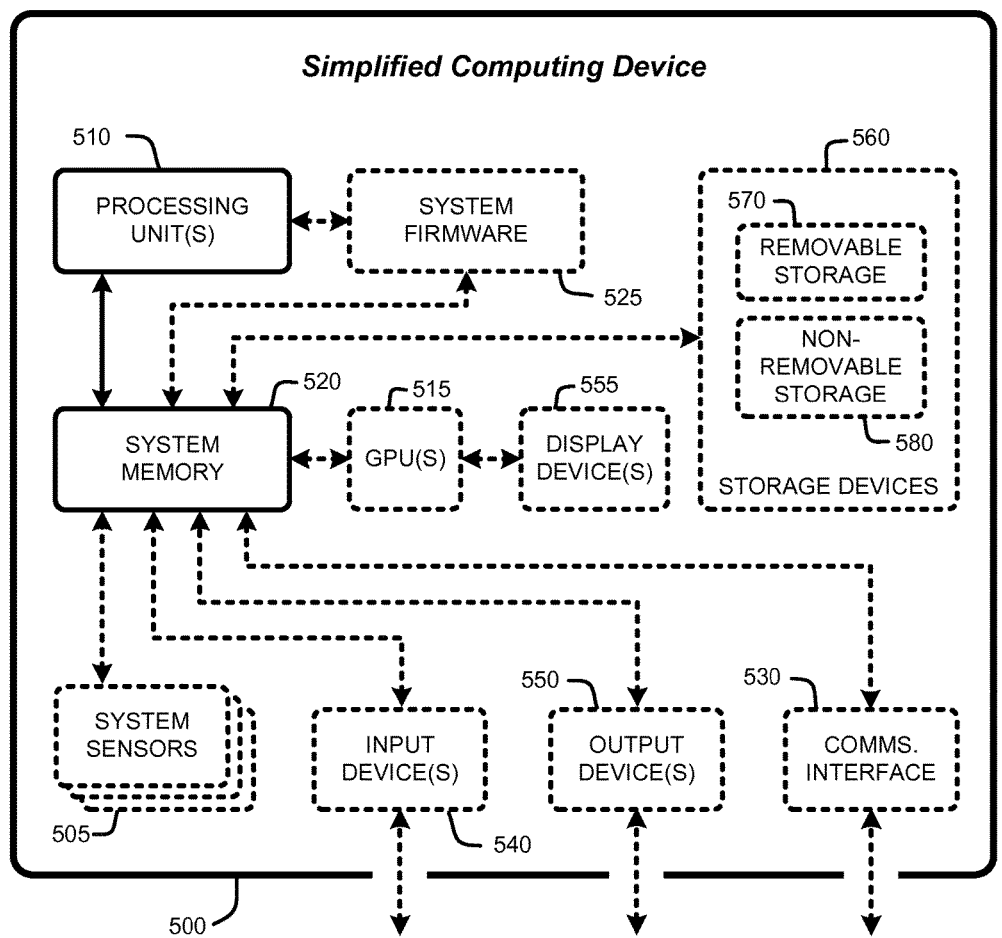
FIG. 5 is a general system diagram depicting a simplified general-purpose computing device having simplified computing and I/O capabilities for use in effecting various implementations of the Poll Optimizer, as described herein.

The Poll Optimizer implementations described herein are operational within numerous types of general purpose or special purpose computing system environments or configurations. FIG. 5 illustrates a simplified example of a general-purpose computer system on which various implementations and elements of the Poll Optimizer, as described herein, may be implemented. It is noted that any boxes that are represented by broken or dashed lines in the simplified computing device 500 shown in FIG. 5 represent alternate implementations of the simplified computing device. As described below, any or all of these alternate implementations may be used in combination with other alternate implementations that are described throughout this document.

The simplified computing device 500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Poll Optimizer implementations described herein, the device should have a sufficient computational capability and system memory to enable basic computational operations. In particular, the computational capability of the simplified computing device 500 shown in FIG. 5 is generally illustrated by one or more processing unit(s) 510, and may also include one or more graphics processing units (GPUs) 515, either or both in communication with system memory 520. Note that that the processing unit(s) 510 of the simplified computing device 500 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 500 may also include other components, such as, for example, a communications interface 530. The simplified computing device 500 may also include one or more conventional computer input devices 540 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 500 and with any other component or feature of the Poll Optimizer, including input, output, control, feedback, and response to one or more users or other devices or systems associated with the Poll Optimizer, are enabled by a variety of Natural User Interface (NUI) scenarios. The NUI techniques and scenarios enabled by the Poll Optimizer include, but are not limited to, interface technologies that allow one or more users user to interact with the Poll Optimizer in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 540 or system sensors 505. Such NUI implementations are also enabled by the use of various techniques including, but not limited to, information derived from system sensors 505 or other input devices 540 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Poll Optimizer.

However, it should be understood that the aforementioned exemplary NUI scenarios may be further augmented by combining the use of artificial constraints or additional signals with any combination of NUI inputs. Such artificial constraints or additional signals may be imposed or generated by input devices 540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Poll Optimizer.

The simplified computing device 500 may also include other optional components such as one or more conventional computer output devices 550 (e.g., display device(s) 555, audio output devices, video output devices, devices for transmitting wired or wireless data transmissions, and the like). Note that typical communications interfaces 530, input devices 540, output devices 550, and storage devices 560 for general-purpose computers are well known to those skilled in the art, and will not be described in detail herein.

The simplified computing device 500 shown in FIG. 5 may also include a variety of computer-readable media. Computer-readable media can be any available media that can be accessed by the computing device 500 via storage devices 560, and include both volatile and nonvolatile media that is either removable 570 and/or non-removable 580, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Poll Optimizer implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 525, hardware, or any combination thereof to control a computer to implement the disclosed subject matter. The term "article of manufacture" as used herein is intended to encompass a computer program accessible from any computer-readable device, or media.

The Poll Optimizer implementations described herein may be further described in the general context of computer-executable instructions, such as program modules, being executed by a computing device. Generally, program modules include routines, programs, objects, components, data structures, and the like, that perform particular tasks or implement particular abstract data types. The Poll Optimizer implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations

The foregoing description of the Poll Optimizer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the Poll Optimizer. It is intended that the scope of the Poll Optimizer be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Poll Optimizer described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A system for optimizing computer-based crowd-sourced polling, comprising:
   a processor; and
   a memory comprising instructions that, when executed by the processor, cause the processor to perform a method comprising:
   receiving an input query representing a crowd-sourced poll comprising two or more branches, each branch associated with a corresponding set of worker qualifications, the query being formatted as a multi-layer structure;
   iteratively reducing the multi-layer structure of the input query to construct a reformulated query, the reformulated query having a reduced complexity relative to the input query;
   reducing one or more of expected completion time and expected cost associated with the reformulated query by matching the reformulated query to an optimized execution process selected from a plurality of pre-defined execution processes;
   presenting the reformulated query and matching optimized execution process as an optimized version of the crowd-sourced poll for execution via a computer-based crowd-sourcing backend;
   during execution of the optimized version of the crowd-sourced poll, improving poll efficiency by automatically changing the matching optimized execution process to another of the predefined execution processes and dynamically changing the reformulated query to correspond to the automatically changed execution process in response to collected runtime statistics relating to execution of the optimized version of the crowd-sourced poll; and
   further during execution, presenting the changed reformulated query and changed matching optimized execution process for continued execution via the computer-based crowd-sourcing backend.

2. The system of claim 1 wherein iteratively reducing the multi-layer structure of the input query further comprises removing intermediate structures in the input query by recursively flattening expressions of each of a plurality of clauses in each layer and then logically combining like clauses between different layers of the input query, thereby constructing the reformulated query.

3. The system of claim 1 wherein iteratively reducing the multi-layer structure of the input query further comprises:
   creating a first set of questions comprising general and demographic comparisons that are gathered from the input query;
   flattening the input query and creating a second set of questions comprising one or more filter questions extracted from the flattened query; and
   constructing the reformulated query from the first set of questions in combination with a subset of questions from the second set of questions that are not already addressed by the first set of questions.

4. The system of claim 1 wherein iteratively reducing the multi-layer structure of the input query further comprises:
   identifying common subexpressions in the input query; and
   merging common subexpressions so that expressions in the input query reference merged subexpressions in place of the common subexpressions.

5. The system of claim 1 wherein matching the reformulated query to an optimized execution process selected from a plurality of predefined execution processes further comprises post-filtering available crowd-sourced workers to include crowd-sourced workers matching qualifying questions extracted from the input query.

6. The system of claim 1 wherein matching the reformulated query to an optimized execution process selected from a plurality of predefined execution processes further comprises performing an automated process comprising:
   querying crowd-sourced workers to determine which crowd-sourced workers match qualifying questions extracted from the input query; and
   inviting crowd-sourced workers that match the qualifying questions to respond to the reformulated query.

7. The system of claim 1 wherein matching the reformulated query to an optimized execution process selected from a plurality of predefined execution processes further comprises performing an automated process comprising:
   presenting crowd-sourced workers with one or more multiple choice questions to determine which crowd-sourced workers match qualifying questions extracted from the input query; and
   inviting crowd-sourced workers that match the qualifying questions to respond to the reformulated query.

8. The system of claim 1 further comprising automatically determining relative numbers of workers for each of two or more branches of the crowd-sourced poll during execution of the poll via the crowd-sourcing backend.

9. The system of claim 8 further comprising automatically adapting payment offers to workers meeting qualifications of under-represented branches to increase numbers of qualified workers in those under-represented branches, each under-represented branch having fewer workers than a predetermined percentage of workers for that branch.

10. The system of claim 8 further comprising automatically adapting payment offers to workers meeting qualifications of over-represented branches to decrease numbers of qualified workers in over-represented branches, each over-represented branch having more workers than a predetermined percentage of workers for that branch.

11. The system of claim 1 further comprising automatically inviting workers assigned to a pre-constructed worker panel via an automated iterative panel building process to respond the optimized version of the crowd-sourced poll via the crowd-sourcing backend.

12. A computer-implemented process, comprising:
using a computer to perform process actions for:
receiving a crowd-sourced query formatted as a multi-layer structure, the crowd-sourced query comprising two or more branches, each branch associated with a corresponding set of worker qualifications;
applying one or more optimizations to the crowd-sourced query to construct a reformulated query, said optimizations serving to reduce a complexity of the crowd-sourced query;
reducing one or more of expected completion time and expected cost associated with the reformulated query by matching the reformulated query to an optimized execution process;
presenting the reformulated query and matching optimized execution process as an optimized version of the crowd-sourced query for execution via a computer-based crowd-sourcing backend;
during execution of the optimized version of the crowd-sourced query, improving query efficiency by automatically changing the matching optimized execution process to a different optimized execution processes and dynamically changing the reformulated query to correspond to the automatically changed execution process in response to collected runtime statistics relating to execution of the optimized version of the crowd-sourced query; and
further during execution, presenting the changed reformulated query and changed matching optimized execution process for continued execution via the computer-based crowd-sourcing backend.

13. The computer-implemented process of claim 12 wherein a query flattening optimization comprises:
iteratively removing intermediate structures in the crowd-sourced query by recursively flattening expressions of each of a plurality of clauses in each layer of the crowd-sourced query; and
logically combining like clauses between different layers of the crowd-sourced query.

14. The computer-implemented process of claim 12 wherein a query splitting optimization comprises:
flattening the crowd-sourced query by gathering general and demographic questions that filter based on demographic characteristics into a single where clause; and
gathering the remaining questions of the crowd-sourced query into a single select clause.

15. The computer-implemented process of claim 12 wherein a common subexpression elimination optimization comprises:
identifying common subexpressions in the input query; and
merging the identified common subexpressions so that expressions in the input query reference merged subexpressions in place of the common subexpressions.

16. The computer-implemented process of claim 12 wherein matching the reformulated query to an optimized execution process further comprises selecting one or more execution processes from a plurality of predefined execution processes, the plurality of predefined execution processes comprising:
post-filtering available crowd-sourced workers to include crowd-sourced workers matching qualifying questions extracted from the crowd-sourced query;
inviting a first set of crowd-sourced workers that match qualifying questions extracted from the crowd-sourced query to respond to the reformulated query; and
inviting a second set of crowd-sourced workers that match predetermined qualifications determined via one or more multiple choice questions to respond to the reformulated query.

17. The computer-implemented process of claim 12 further comprising:
automatically adapting payment offers to workers meeting qualifications of under-represented branches of the crowd-sourced query to increase numbers of qualified workers in those under-represented branches, each under-represented branch having less than a predetermined number of workers for that branch; and
automatically adapting payment offers to workers meeting qualifications of over-represented branches of the crowd-sourced query to decrease numbers of qualified workers in over-represented branches, each over-represented branch having more than a predetermined number of workers for that branch.

18. A cloud-based crowd-sourced query system, comprising:
a general purpose computing device; and
a computer program comprising program modules executable by the computing device, wherein the computing device is directed by the program modules of the computer program to:
receive a crowd-sourced query comprising two or more branches, each branch associated with a corresponding set of worker qualifications;
apply one or more automated optimizations to the crowd-sourced query to construct a reformulated query, the reformulated query having a reduced complexity relative to the crowd-sourced query;
reduce one or more of expected completion time and expected cost associated with the reformulated query by associating the reformulated query with a matching optimized execution process selected from a plurality of predefined execution processes;
provide the reformulated query and matching optimized execution process as an optimized version of the crowd-sourced query for execution via a cloud-based crowd-sourcing backend;
during execution of the optimized version of the crowd-sourced query, improve query efficiency by automatically changing the matching optimized execution process to a different one of the predefined execution processes and dynamically changing the reformulated query to correspond to the changed execution process in response to collected runtime statistics relating to execution of the optimized version of the crowd-sourced query; and
further during execution, presenting the changed reformulated query and changed matching optimized execution process for continued execution via the cloud-based crowd-sourcing backend.

19. The cloud-based crowd-sourced query system of claim 18 wherein the crowd-sourced query is formatted as a multi-layer structure, and wherein the automated optimizations include any combination of query flattening, query splitting, and common subexpression elimination.

20. The cloud-based crowd-sourced query system of claim 18 wherein matching the reformulated query to an optimized execution process further comprises selecting one or more execution processes from a plurality of predefined execution processes, the plurality of predefined execution processes comprising:

post-filtering available crowd-sourced workers to include crowd-sourced workers matching qualifying questions extracted from the crowd-sourced query;

inviting a first set of crowd-sourced workers that match qualifying questions extracted from the crowd-sourced query to respond to the reformulated query; and inviting a second set of crowd-sourced workers that match predetermined qualifications determined via one or more multiple choice questions to respond to the reformulated query.

* * * * *